W. J. PHELPS.
APPARATUS FOR SOLDERING SIDE SEAMS OF CAN BODIES.
APPLICATION FILED MAR. 22, 1910.
993,195.
Patented May 23, 1911.
4 SHEETS—SHEET 3.
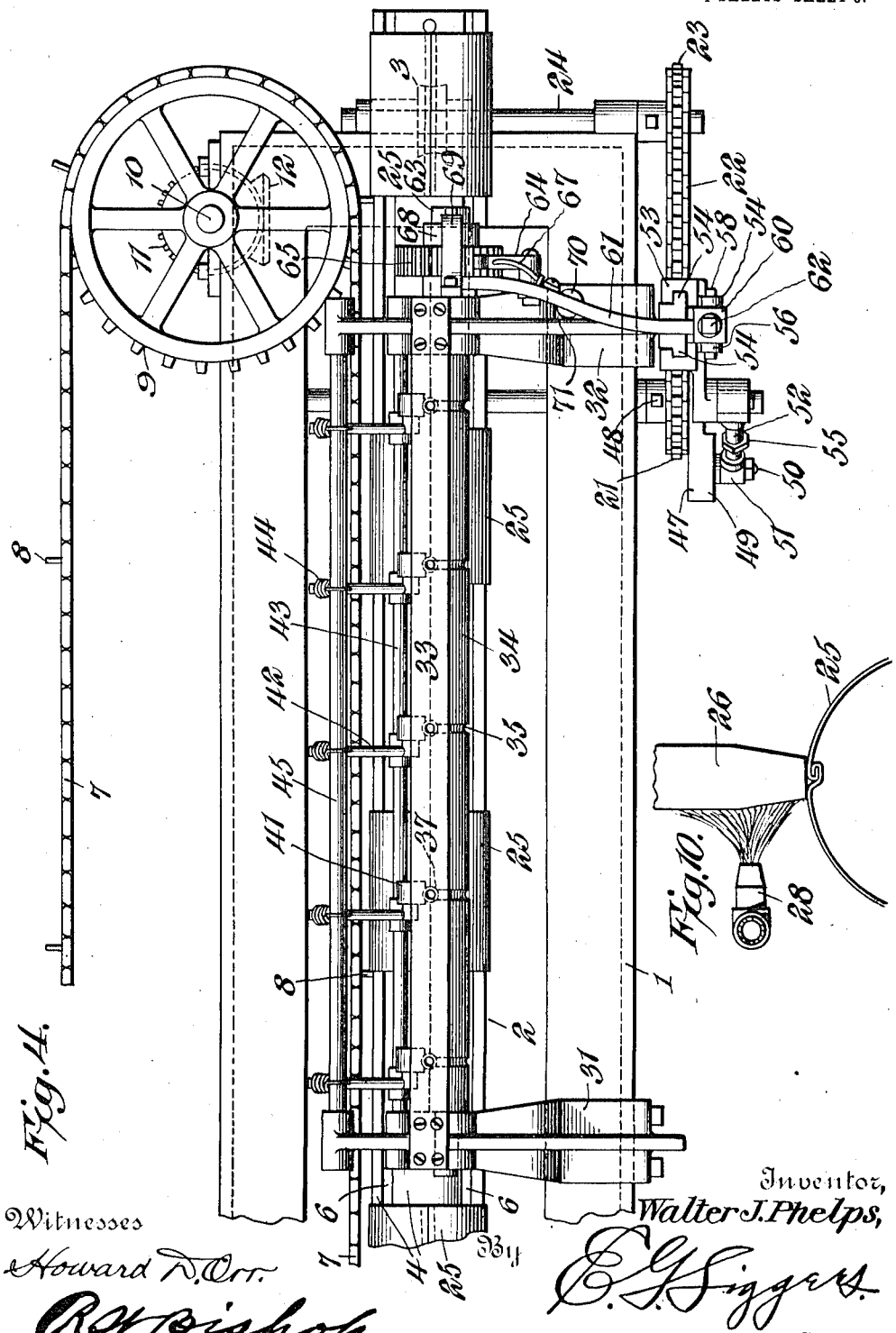

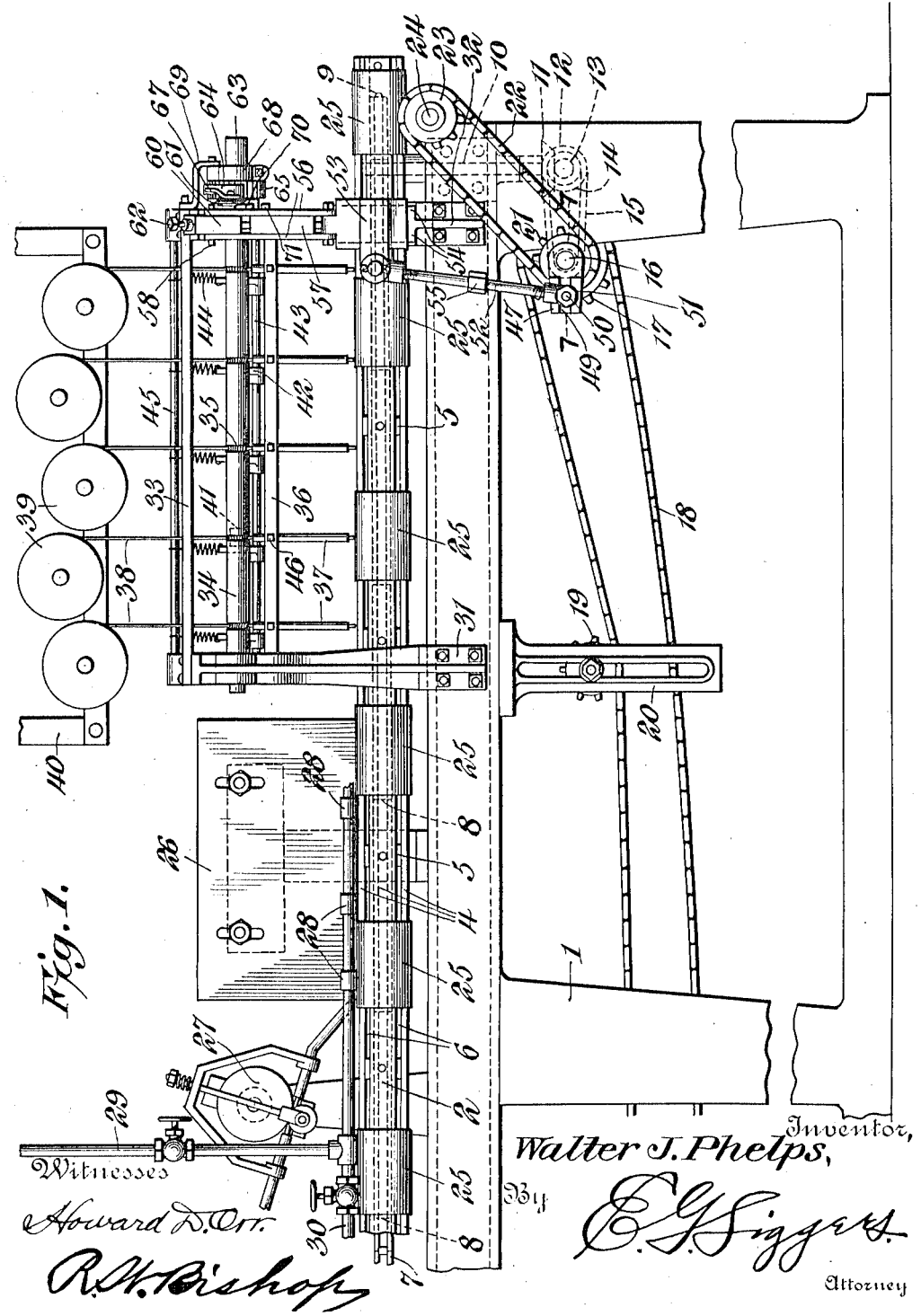

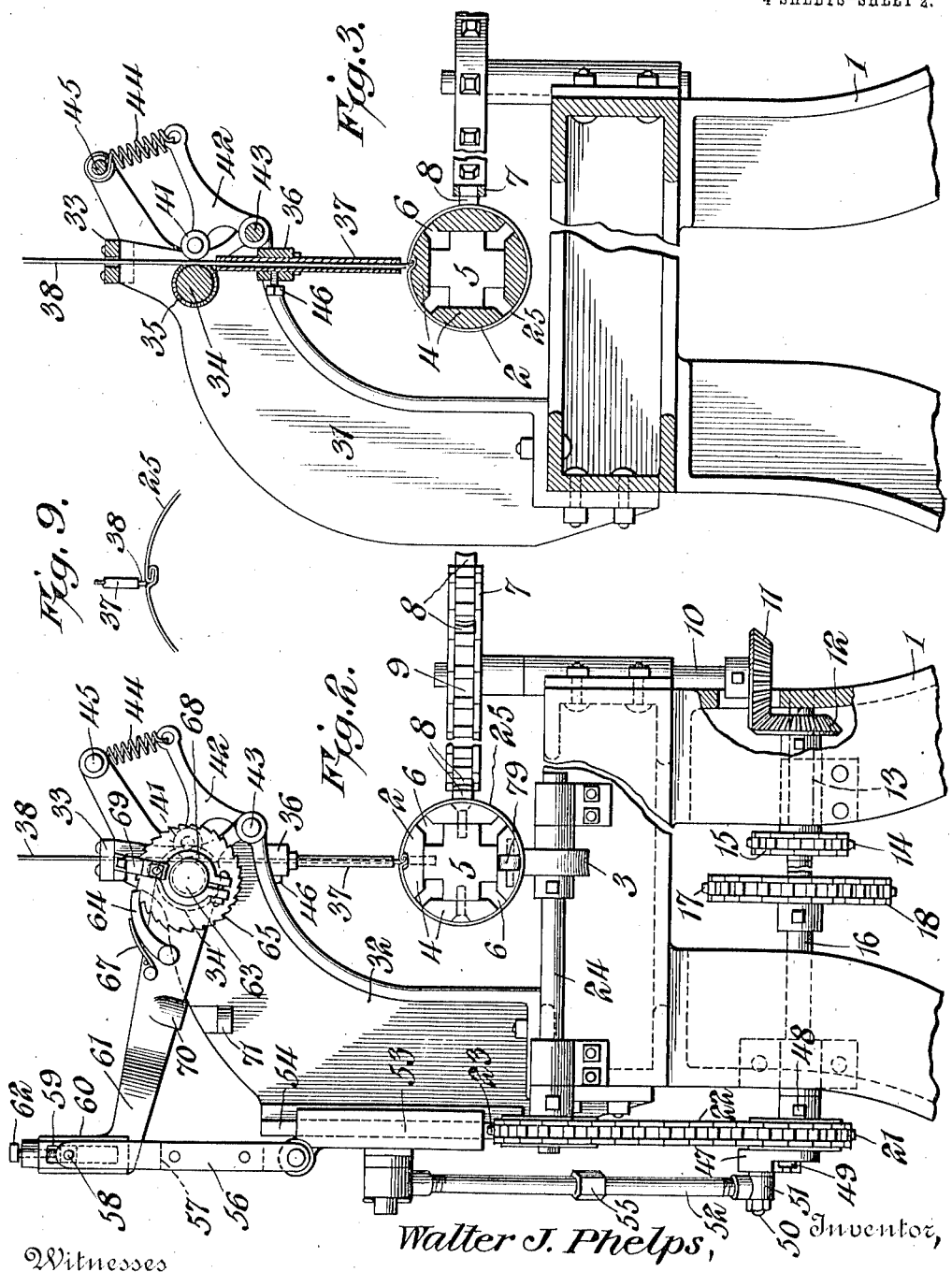

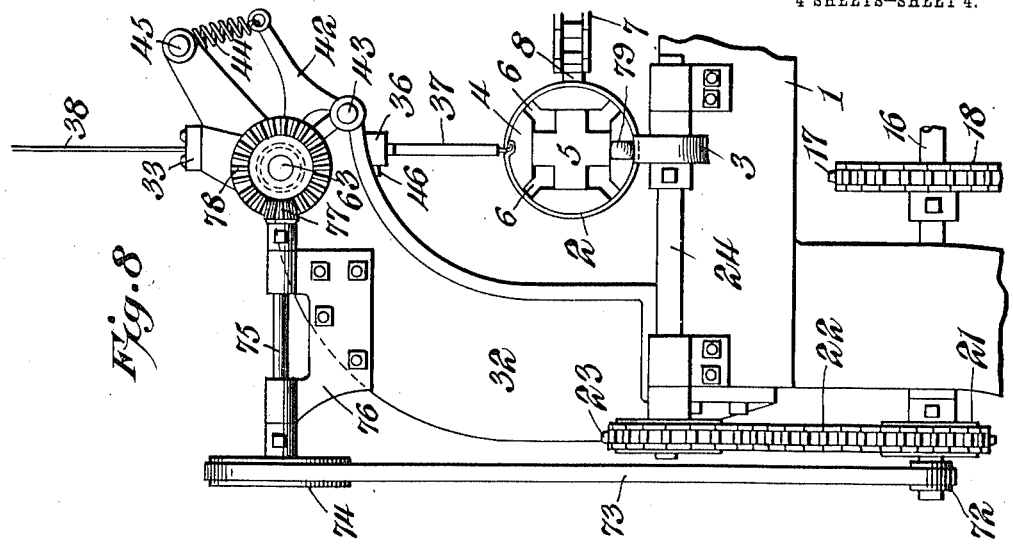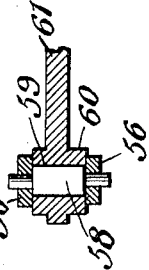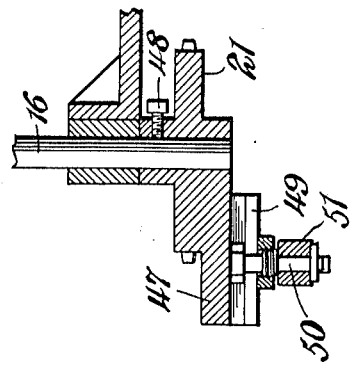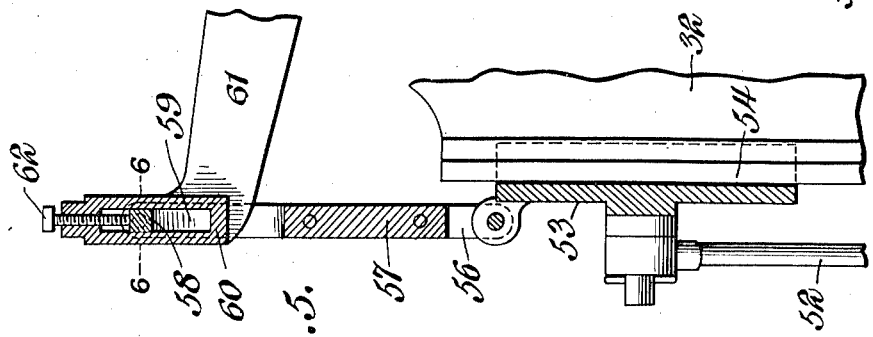

UNITED STATES PATENT OFFICE.

WALTER J. PHELPS, OF BALTIMORE, MARYLAND.

APPARATUS FOR SOLDERING SIDE SEAMS OF CAN-BODIES.

993,195. Specification of Letters Patent. Patented May 23, 1911.

Application filed March 22, 1910. Serial No. 550,904.

*To all whom it may concern:*

Be it known that I, WALTER J. PHELPS, a citizen of the United States, residing in Baltimore city and State of Maryland, have invented a new and useful Apparatus for Soldering Side Seams of Can-Bodies, of which the following is a specification.

This invention relates to the soldering of the side seams of can bodies and aims to produce a can in which the side seam will be more efficiently and economically soldered than has been heretofore possible.

The practice often heretofore in soldering interlocked side seams of can bodies has been to deliver all the solder necessary to completely solder the seam directly to the solder iron and apply the solder in a single operation. This practice has been objectionable because, owing to the high speed at which the machine is operated, the can body was only momentarily under the soldering iron and, consequently, the solder did not fully penetrate the joint or seam but tended to spread on each side of the same, and as the can body is of a cylindrical form, the solder as it spread from the joint would run over the can body and be lost.

One object of my invention is to improve the operation so that only a thin film of solder is delivered to the joint under the soldering iron and, consequently, the solder will not spread over the can body and be lost but will enter the seam so as to fully penetrate the same.

It has also been heretofore proposed to pass the can bodies with the seams uppermost across a thread or wire of cold solder, but, in this operation, the can bodies were highly heated by the direct application of heat thereto before they passed to the solder wire or thread, and, owing to the expansion of the body under the influence of the heat, the seam was opened or spread to an extent that frequently interfered with the soldering operation. Furthermore, the flux was partly destroyed by the extreme heat before the solid solder was applied to the can body and successful soldering required the careful application of a large quantity of the flux.
Moreover, in raising the can body to a temperature which would melt the solder, the tin coating of the body would be melted and the body permanently discolored and otherwise damaged.

In the practice of my invention, the can bodies are passed successively under and in rubbing contact with a soldering iron and then under and against a wire or thread of cold solder or a plurality of such wires or threads. A quantity of solder is initially fed to the soldering iron sufficient to keep the iron tinned but not sufficient to completely fill the joint or seam of the can body, and this solder is heated by the soldering iron which, in turn, is heated by means of burners or heaters arranged adjacent the soldering iron. This heated solder is fed in a very thin film to the passing can body by the soldering iron, and the can body is then immediately passed across a thread or threads of cold solder from which a small portion is melted by the heated film previously applied to the can body by the soldering iron, and the extraction of the heat from the film in melting the cold solder serves to solidify the solder in the joint so that when the can is delivered from the machine, the joint is completely filled without any waste of solder.

An apparatus embodying my invention is illustrated in the accompanying drawings, in which, Figure 1 is a side elevation of so much of a machine as is necessary for the understanding of my improvements. Fig. 2 is an end elevation of the same. Fig. 3 is a vertical transverse section through one of the guiding devices or sleeves for the wire solder. Fig. 4 is a plan view. Fig. 5 is a detail sectional view of a part of the means for feeding the cold solder wires. Fig. 6 is a detail sectional view on the line 6—6 of Fig. 5. Fig. 7 is a detail sectional view on line 7—7 of Fig. 1. Fig. 8 is an end elevation showing a modification. Fig. 9 is a detail transverse section showing one of the solder wires and a portion of a can body. Fig. 10 is a detail transverse section taken adjacent the end of the soldering iron and looking toward the same.

In carrying out my invention, I employ a supporting frame 1 which may be of any desired formation, and upon this supporting frame is arranged a horn or guide 2 supported at one end upon a roller 3 and having its other end supported in any desired manner adjacent the can-forming mechanism in position to receive the can bodies from said mechanism, which is not illustrated in the drawing and forms no part of my invention. This horn or guide 2 consists of a plurality of longitudinally-disposed bars 4 having convex outer surfaces and connected at intervals by spacing blocks 5 whereby the bars or strips 4 are held in fixed relation with spaces 6 between their edges, the said spaces serving to permit the escape of any small particles of solder which may drop from the seams in the can bodies or from any parts of the apparatus, and thereby prevent the said particles adhering to the horn and interfering with the movement of the can bodies over the same. Adjacent the horn or guide 2, I provide a can-feeding mechanism consisting of an endless chain 7 having spurs or teeth 8 projecting outward therefrom at intervals and passing around a sprocket wheel 9 which is mounted on the upper end of a vertically-disposed shaft 10 journaled in suitable brackets on the supporting frame 1 and provided with a bevel pinion 11 at its lower end. This bevel pinion 11 meshes with a similar pinion 12 secured on the rear end of a short shaft 13 journaled in suitable bearings on the supporting frame and provided with a sprocket wheel 14 at its inner end, as shown most clearly in Fig. 2. The sprocket wheel 14 is connected by a suitable sprocket chain indicated in dotted lines at 15 in Fig. 1, with a sprocket pinion on a transverse shaft 16, which shaft is set in motion through a sprocket wheel 17 at the center of the same engaged by a driving chain 18 which extends to a suitable driving shaft arranged in connection with the mechanism for forming the can bodies. This driving chain 18 is held in proper relation to the sprocket wheel by an idler pinion or chain tightener 19 secured upon a bracket 20 in any suitable manner, as will be readily understood. On the front end of the shaft 16 is a sprocket pinion 21 which is connected by a sprocket chain 22 with a sprocket pinion 23 on the front end of a shaft 24 which carries the horn supporting roller 3, as clearly shown.

The mechanism thus far described serves to impart a rotary motion to the shaft 10 and to the shaft 24, so that the roller 3 will support the horn or guide 2 and also, by frictionally engaging the can bodies, serve to support the can body at the end of the horn and positively feed the same over the end of the horn after it has been released from its engagement with the feeding chain 7. The rotation of the shaft 10 serves to positively actuate the feeding chain and, consequently, move the can bodies, indicated at 25, positively over the horn or guide 2, it being understood that the chain 7 is approximately equal in length to the horn and the pins or spurs 8 on the said chain are so spaced apart as to engage the successive can bodies and feed the same rapidly along the horn under the soldering devices.

Arranged adjacent the horn or guide 2 is a soldering iron 26, and in advance of the said iron is a solder-feeding mechanism 27 which is of ordinary construction and operation and needs no detailed explanation herein, inasmuch as it may be of any well-known type and is illustrated only for the purpose of disclosing the operation of my invention, the particular construction of the said solder-feeding mechanism being immaterial. I also arrange a series of burners 28 adjacent the soldering iron 26 and these burners are supplied with fuel through a gas pipe 29 and an air pipe 30 so as to produce a hot flame or flames playing on the lower edge of the soldering iron in order to rapidly melt and heat the solder supplied thereto. In actual practice, the solder-feeding mechanism will be so adjusted as to feed a thin film of solder to the soldering iron just sufficient to keep the said iron tinned but insufficient to completely fill the seam in the passing can bodies. Beyond the soldering apparatus consisting of the soldering iron, the burners and the solder-feeding mechanism just described, I secure to the supporting frame 1, standards 31 and 32 which project above the said frame and are connected at their upper ends by a brace and guide bar 33. Below the said brace and guide bar 33, a roller 34 is journaled in and extends between the said standards, and this roller is constructed with a plurality of annular grooves 35 which will preferably be milled and correspond in number to the number of solder wires which will be used in the apparatus to complete the soldering operation. Below this guide roller 34, a guide bar 36 is secured to and extends between the standards, and in the said guide bar I secure a series of guiding tubes or sleeves 37 through which a solder wire 38 passes to project into the path of the can bodies passing over the guide or horn 2 below the said sleeves, as clearly shown in Figs. 1 and 3.

The solder wires 38 will be carried upon spools 39 mounted in any suitable support 40 above the machine and the several wires will be respectively held against the feed roller 34 and within an annular groove therein by an idler presser roller 41 mounted upon one arm of an angle lever 42 which is pivoted at its lower end upon a rod 43 secured to and extending between the standards and having its upper and outer end connected by a spring 44 with a suitable rod 45 supported by the standards. The spring 44 will serve to hold the angle lever in such position that the solder wire will be pressed against the feeding roller by the idler 41 and will be positively fed downward to act upon the can bodies while the long guiding sleeve or tube 37 serves to prevent bending or breaking of the wire above the point of its engagement with the can bodies. Should it be necessary to supply a new wire to the apparatus, the springs 44 will readily permit the lever 42 to be swung away from the feed roller so as to permit the insertion of the wire through the openings in the guide bar 33 and through the tube 37, as will be readily understood. Furthermore, should there be some unevenness or irregularity in the wire which will not be removed by the openings in the guide bar 33, the pressing device consisting of the lever 42 with the idler 41 thereon, will yield sufficiently to prevent interference with the feeding of the wire but at the same time will press upon the same with sufficient force to remove the unevenness. The guiding sleeves or tubes 37 are secured in the guide bars 36 by means of set screws 46 so that the tubes may be adjusted to or from the horn or fixed guide and thereby permit more or less of the solder wires to project below the lower ends of the tubes and assure the feeding of the proper amount of solder to the can body, as may be determined by experience to be necessary for the proper soldering of the particular cans being treated.

In practice, several solder wires may be employed and each wire will pass through a separate guiding tube or sleeve so that as the can body passes over the horn or fixed guide, it will be caused to successively contact with all of the wires. A single wire of greater thickness might be used or a greater length of a single wire fed at a single step to the path of the can bodies, but most successful results are obtained by employing a number of thin wires or threads and feeding a small quantity at each step. The desideratum is to feed a small quantity of solder to the can at each step because the high speed of the passing can bodies precludes the melting of more than a very small amount of solder from each wire, in actual practice the amount being about one-eighteenth or one-twentieth of an inch from each wire. For this reason, it is better to rely upon a number of wires in order to get the necessary amount of solder into the joint or seam. Owing to the very slight forward movement of the solder wires, it has been found that it makes very little, if any, difference as to whether the solder is fed downward while the can body is passing beneath the same or fed wholly in the space between successive bodies, or fed partly in the space and partly while the body is passing. Should the solder wires be closer together than the distance between the passing can bodies, it is obvious that it would be impracticable to feed all the wires while the body was passing. When the solder is fed continuously, however, it should be fed very slowly so that the amount fed can be melted by the hot solder placed upon the can body by the preliminary soldering apparatus and it will be distributed directly in the joint, whether the feeding occurs while the body is passing or before the body gets to the solder. If any considerable amount of solder was fed before the body reached the wire, the wire would be bent by the impact of the body and, consequently, the operation would be imperfect, inasmuch as the heat of the solder on the can body at the end which engages the cold solder wire would be insufficient to melt or start melting such an amount of solder. When, however, the feeding is so slight that only about one-twentieth of an inch is fed forward in the interval occupied by the passing of a can body, it is immaterial whether the wire is fed between the successive bodies or directly onto the body, inasmuch as the impact of the can body against such a small quantity of solder wire will serve to lift the small projecting portion of the wire, and this small portion pressing against the body will gradually be melted in the joint during the passing of the body. It is possible, however, to feed the entire quantity of solder necessary while the body is passing by means of an intermittent feeding mechanism, by so locating the feeding tube that the feeding of the wire will start just as the can body comes into position below the tube. In this manner, the feeding of the solder will be coincident with the passing of the can body and will occur only while the can body is passing.

The invention contemplates the employment of either an intermittent or a continuous feed for the cold solder wires and I have illustrated both forms in the accompanying drawings. In the preferred form of the invention, I employ an intermittent feed and to that end I provide a crank arm 47 on the end of the shaft 16, which crank arm is preferably formed integral with the sprocket pinion 21, the said sprocket pinion being secured to the shaft by means of a set screw 48, as shown most clearly in Fig. 7. The crank arm 47 is provided with the parallel ribs or guides 49 disposed radially with respect to the sprocket pinion 21, and to the said guides, I secure a wrist pin 50 which passes through an eye 51 on the lower end of a pitman 52, the upper end of which is pivotally connected to a slide 53 fitted upon ribs 54 formed on the end standard 32, as clearly shown. The provision of the guides 49 and the wrist pin 50 permits me to adjust the stroke of the pitman 52 to the necessities of any particular apparatus and, in order to accommodate the pitman to the different strokes consequent upon the adjustment of the wrist pin, I construct the pitman in two members connected by a central turn buckle or similar coupling device 55, as shown most clearly in Fig. 1. The slide 53 has parallel links 56 pivotally attached to its upper end and these links are braced and held in their proper parallel relation by a spacing block 57 secured between the same, as clearly shown. Between the upper ends of the links 56, I secure a cross head 58 which passes through a slot 59 in a box 60 which is formed on the end of a lever 61 and has a set screw 62 mounted in its upper end and adapted to be engaged by the cross head 58 so as to adjust the throw of the lever 61, as will be presently set forth. The lever 61 is loosely fulcrumed upon the projecting journal 63 of the feeding roller 34 and carries a pawl 64 adapted to engage a ratchet wheel 65 which is secured to the said journal so that the reciprocation of the lever will serve to actuate the ratchet wheel and thereby turn the feeding roller so as to feed the solder wire. The pawl 64 is held in engagement with the ratchet 65 by a spring 67, and, in order to prevent a re-action or backward movement of the feeding roller on the reverse movement of the lever, I provide a friction clamp 68 which consists of a split ring fitted around the journal 63 and held in engagement therewith by a suitable bolt inserted through the terminals of the ring. The ring is carried by a bracket 69 which is secured rigidly to the outer side of the standard 32 at the upper end of the same and will be thereby prevented from rotating with the journal. The ring will be clamped against the journal with sufficient force to hold it against any backward movement, but not so tightly as to prevent the forward rotation of the journal and the feed roller under the influence of the actuating mechanism. It will be readily seen from the foregoing description that the cross head 58 will engage the end of the screw 62 on the upward movement of the slide 53 and will, consequently, raise the lever 61 so that the pawl 64 will actuate the ratchet wheel 65. On the downward movement of the slide, however, the lever will tend to return to its former position through the influence of its own weight and, in order to prevent the lever dropping below the central transverse line of the feeding roller, I provide a lug or offset 70 on the side of the same adapted to engage a similar lug or offset 71 on the side of the standard, so that the downward movement of the lever will be limited. The lever will, consequently, always come to rest in that position in which it may be most easily acted upon by the operating mechanism and the stroke of the lever may be regulated by adjusting the screw 62, as will be readily understood. The slot 59 within the box 60 at the outer end of the lever provides for sufficient lost motion between the end of the lever and the cross head 58 to permit the slide 53 to make its full stroke without causing excessive feeding of the solder wire through a prolonged movement of the lever. It will thus be seen that during each rotation of the shaft 16, the slide will be actuated and will, in turn, operate through the lever 61 and the mechanism coöperating therewith to feed the solder wires forward the proper distance for the successful operation of the invention.

Should a continuous feeding of the solder wires be preferred, the mechanism illustrated in Fig. 8 will be employed. In this mechanism, the crank arm 47 is not utilized and, instead of the same, a friction pulley 72 is employed, the said pulley being connected by a belt 73 with a larger pulley 74 on the end of a shaft 75 journaled in a suitable bracket 76 secured upon the standard near the upper end of the same. The opposite end of the shaft 75 is equipped with a bevel pinion 77 meshing with a bevel gear wheel 78 on the end of the feeding roller, and the several parts are so proportioned as to reduce the speed imparted to the pulley 72 by the shaft 16, so that the feed roller will be rotated very slowly.

It is believed the operation and advantages of my invention will be fully understood and appreciated from the foregoing description, taken in connection with the accompanying drawings, and a further detailed statement of the same is believed to be unnecessary. It will be observed that the can bodies are fed continuously over the horn or fixed guide, past the initial soldering apparatus, and then immediately thereafter across the ends of the cold solder wires and discharged from the end of the horn, this discharging being assured by reason of the rotation of the roller 3 and a small roller 79 provided at the end of the horn to bear upon the inner side of the can body and hold the same in contact with the feeding roller 3. A very small amount of solder (about one-third of the amount heretofore employed) is applied to the seam at the soldering iron and this thin film of solder will be highly heated by the soldering iron. The solder will not have time to cool before the can body reaches the first thread or wire of cold solder and the heat of the initially applied film will melt from the cold thread or wire a small quantity of solder which will re-act on the film so as to partially cool the same. This operation is repeated at each succeeding thread or wire of cold solder and a slight additional quantity of solder thereby fed into the joint or seam, so that by the time the can body has passed all of the cold solder wires, the joint will be completely filled and its members united without any waste of solder and without the formation of any imperfect joints. Inasmuch as the cold solder will be very gradually melted and the hot solder will be just as gradually cooled, the solder will be applied directly to the joint without any waste and in such manner as to attain highly satisfactory results. My invention economizes in the use of solder over the previous practice, in which the solder was fed to the can bodies in such a large quantity that it spread out on both sides of the seam and rolled from the can body, and this waste or loss was so pronounced that generally a flame or series of flames was used in an effort to drive the solder into the joint by more heat than was given off by the iron. Furthermore, my invention dispenses with the use of wipers inasmuch as so little metal is used that there is practically no surplus to wipe from the joint. This is further advantageous for the reason that it is practically impossible to wipe a hot joint without removing some of the tin coating of the body along with the solder and thereby produce inferior cans. In the practice of my invention, the joint becomes too cool before the can is discharged to permit the use of wipers, and the wipers could not be used upon the joints produced by my invention without re-heating the joint for that purpose.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

The process involved in my invention is not herein claimed.

Having thus described the invention, what I claim as new, and desire to secure by Letters Patent, is:—

1. In a machine for soldering the side seams of can bodies, the combination with a soldering apparatus for initially applying a film of solder to the seams of the bodies, said soldering apparatus including a soldering iron, means for heating the same, and means for feeding solder thereto, of means for feeding the can bodies in a defined path with the seams of the can bodies uppermost and in rubbing contact with the said soldering iron, a separate solder feeding means arranged in the path of the can bodies and above the same and beyond the initial solder applying apparatus for feeding a solder wire or thread of solder directly to the seams of the said can bodies, the solder fed by the said means entering the seams of the cans as they move along and being caused to melt by the heat from the solder applied by the first-mentioned soldering apparatus.

2. In a machine for soldering the side seams of can bodies, the combination with a soldering apparatus for initially applying a film of heated solder to and along the seams of the cans, of means for feeding the cans beneath said soldering apparatus, and separate solder feeding devices for feeding cold solid solder to the cans as they pass beneath said separate devices, the solder fed by the said devices being heated and caused to melt solely by the heat from the solder applied by the first-mentioned soldering apparatus.

3. In a machine for soldering the side seams of can bodies, the combination with means for feeding the can bodies in a defined path with the seams of the can bodies uppermost, a soldering apparatus including a heating means for initially applying to and along the seams of the can bodies a film of solder which is insufficient to complete the soldering of the cans, and a separate means for feeding cold solid solder to the side seams of the can bodies, said solder feeding means being disposed at a point in the path of the can bodies remote from the said soldering apparatus, the solder fed by said means being heated and fused by contact with the solder fed by the first-mentioned soldering apparatus.

4. The combination of a fixed guide, means for feeding can bodies along said guide, a soldering apparatus arranged adjacent the guide and including a soldering iron, a solder-feeding device and a heater, and independent solid solder-feeding mechanism arranged to hold the end of an unheated solder wire adjacent the guide in the path of the can bodies beyond the said soldering apparatus.

5. The combination of a fixed guide, means for feeding can bodies along the said guide, an initial soldering apparatus including a soldering iron, solid solder-feeding mechanism arranged adjacent the guide beyond the said initial soldering apparatus, and a common means for actuating the can body feeding mechanism and the solid solder-feeding mechanism, the last named mechanism comprising feeding means solely for holding the end of an unheated solder wire in the path of the can bodies.

6. The combination of a fixed guide, means for feeding can bodies along the said guide, a soldering apparatus for initially applying a heated film of solder to the can bodies, and a separate soldering apparatus which comprises feeding means only to feed an unheated solder wire adjacent the guide and in contact with the heated film on the cans so that said solder wire may be heated by the film of solder applied by the initially applying apparatus.

7. The combination with a soldering apparatus for initially applying a heated film of solder, of means for feeding the can bodies in a defined path so as to receive the film of solder from the said initially applying apparatus, an auxiliary means comprising feed mechanism only arranged in the path of the can bodies and beyond the initially applying apparatus for feeding an unheated solder wire to the can bodies at the place where the heated film of solder has been put, whereby the unheated solder wire is caused to melt by the heat from the film of solder applied by the first-mentioned apparatus.

8. The combination of a supporting frame, a vertically-movable slide mounted thereon, a driving shaft arranged below the said slide, connections between the said driving shaft and the slide, a feeding roller mounted in the frame above the slide, a lever loosely mounted on the said feeding roller, connections between the feeding roller and the lever whereby the lever will actuate the roller, and a lost motion connection between the slide and the free end of the lever.

9. The combination of a supporting frame, a vertically-moving slide mounted thereon, means for actuating the slide, a feeding roller mounted in the frame above the slide, a lever loosely mounted on the said feeding roller, connections whereby the lever will actuate the roller, a slotted box at the free end of the lever, links pivoted to the slide, and a cross head between the free ends of the links passing through the slotted box at the end of the lever.

10. The combination with a supporting frame, of a vertically moving slide mounted thereon, means for actuating the slide, a feeding roller mounted in the frame, a lever adapted to actuate the feeding roller and having a slotted box at its outer end, links pivoted to the slide and passing on opposite sides of the box, a cross head carried by the links and passing through the slot in the box, and a set screw mounted in the end of the box and adapted to engage the cross head.

11. In a machine for soldering the side seams of can bodies, the combination with a soldering apparatus for initially applying a film of solder to the seams of the bodies, said soldering apparatus including a soldering iron, means for heating the same and means for feeding solder thereto, of means for feeding the can bodies in a defined path with the seams of the can bodies uppermost and in rubbing contact with the soldering iron, and separate solder feeding means arranged in the path of the can bodies and above the same for feeding a solid wire or thread of solder to the seams of the said can bodies, the solder fed by the said means being caused to melt by the heat from the solder applied by the first-mentioned soldering apparatus.

12. In a machine for soldering the side seams of can bodies, the combination with a soldering apparatus for initially applying a film of solder to the seams of the bodies, said soldering apparatus including a soldering iron, means for heating the same and means for feeding solder thereto, of means for feeding the can bodies in a defined path with the seams of the can bodies uppermost and in rubbing contact with the soldering iron, and separate solder feeding means arranged in the path of the can bodies and above the same for feeding a solid wire or thread of solder to the seams of the said can bodies, said solder feeding means consisting of a plurality of spaced devices for feeding wire solder at a series of different points in the path of the can bodies, the said solder fed by the said means being caused to melt by the heat from the solder applied by the first-mentioned soldering apparatus.

In testimony, that I claim the foregoing as my own, I have hereto affixed my signature in the presence of two witnesses.

WALTER J. PHELPS.

Witnesses:
JOHN H. SIGGERS,
DAVID R. WAGNER.